Patented Jan. 19, 1937

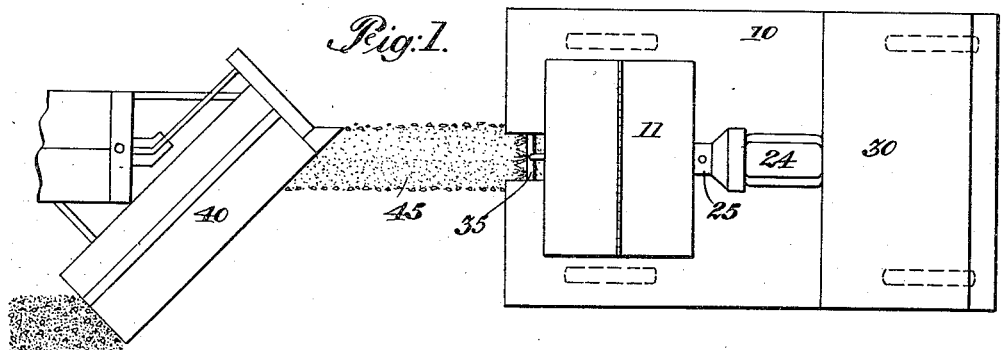
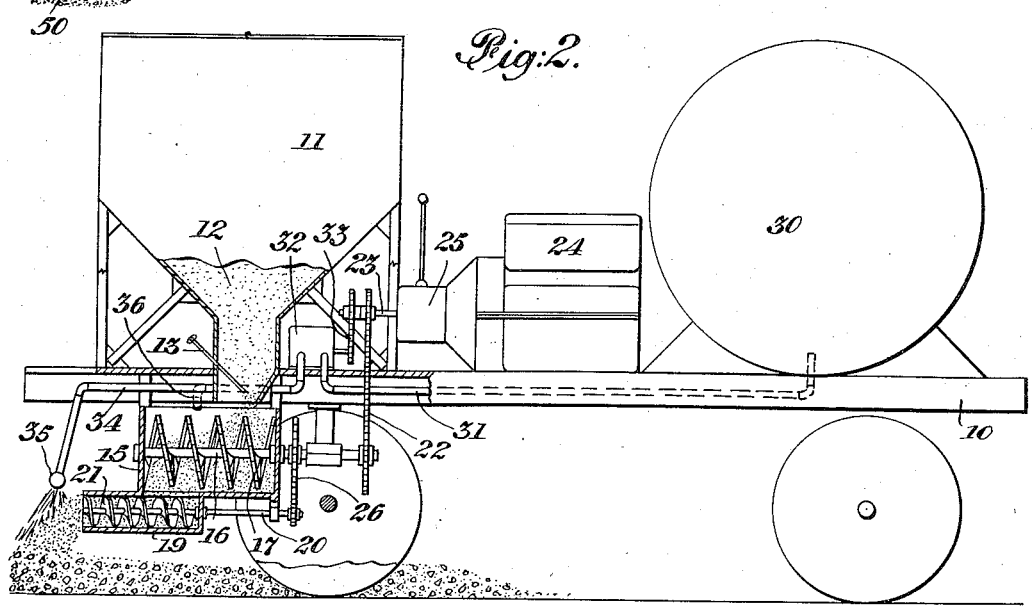
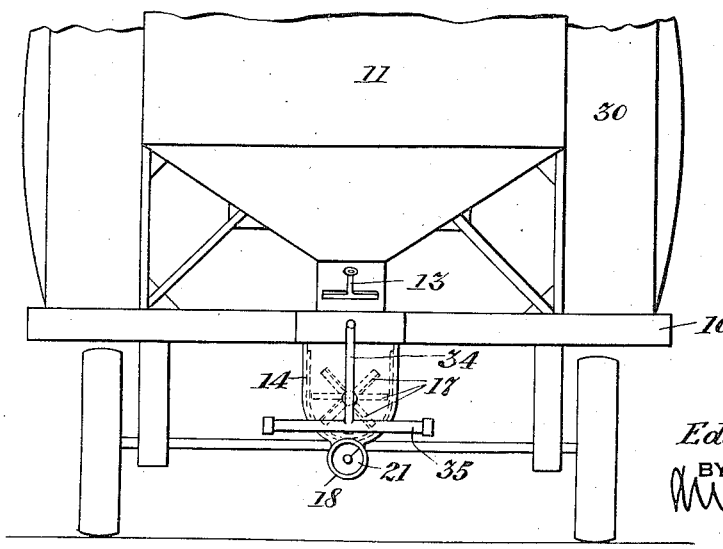

2,068,164

UNITED STATES PATENT OFFICE 2,068,164

METHOD OF PREPARING ROAD PAVING COMPOSITIONS

Edwin B. Cadwell, Saugerties, N. Y., assignor to Merwin F. Ashley, Brooklyn, N. Y.

Application August 11, 1932, Serial No. 628,309

6 Claims. (Cl. 94—23)

My invention relates to road paving compositions of the character which comprises metallic aggregate, such as stone, crushed rock, sand, gravel, etc., and a binder embodying some form of bitumen such as asphalt, tar or pitch, coated over the surfaces of the aggregate particles to bond them together.

In preparing compositions of this type it is necessary to render the binder material more or less fluid in order to coat it evenly over the aggregate particles. Binders of high viscosity which have a high bitumen content and a high melting point afford the best bonding qualities and give maximum stability to the finished pavement. However, inasmuch as the usual high viscosity asphalt oils, tars, etc., are extremely difficult to handle and to coat onto the aggregate surfaces, it has heretofore been the general practice to employ inferior binders of low viscosity and melting point, or to render the more viscous binders adequately liquid either by heating them or by thinning them with liquids which are designed to subsequently escape from the composition or to be absorbed by the aggregate. Highly volatile solvents or cut backs, such as naptha, or water in which the bituminous binder is emulsified are the usual thinning liquids.

One object of my invention is to provide an improved low-cost method of preparing bituminous road paving compositions which will permit the employment at ordinary atmospheric temperatures of high viscosity bituminous binders without the addition of cut backs or other thinning liquids calculated to subsequently escape from the binder, although such thinning liquids may be used in conjunction with my method, if desired, as will hereafter be more fully set forth.

Another object of my invention is to provide a method affording these advantages which may be employed to prepare road-mixed compositions of this type, and other and further objects will appear from the following specification.

In carrying out my method, I coat the aggregate surfaces with a binder material of paste-like consistency which I prepare by mechanically admixing the solid and fluid ingredients of a suitable high viscosity bituminous cement, the solid ingredients being first finely divided or reduced to a powder or dust. I have found that such a paste may be readily and evenly coated onto the aggregate at ordinary atmospheric temperatures by mechanically admixing it therewith promptly after it is prepared, at which time the paste appears as a moist mass of surface-agglutinated solid bituminous particles. Thereafter, since the fluid part of the binder is a solvent for the solid part, the ingredients will blend together to form a homogeneous cementitious binder of viscosity higher than could be properly coated on the aggregate at normal temperatures without the employment of evanescent thinning liquids of the nature above described. It will be understood that the solid and liquid ingredients of the binder are separately and readily obtainable in the open market, usually as the residuums and distillates, respectively, obtained in refining crude petroleum.

The composition thus prepared, laid and compacted on the roadway, cures in the usual time required for cold laid bituminous concretes and, when coalesced, provides a hard, stable and impervious pavement having no apparent tendency to bleed or to soften in hot weather.

Whenever it is desired to employ a bituminous binder of extremely high melting point and high viscosity, such as may be desirable in tropical climates, and it is found that there is an insufficient quantity of the binder which will remain fluid enough at normal temperatures to provide a moist workable paste when mixed with the finely divided solid ingredients, a volatile solvent cut back or other evanescent liquid may be introduced into the mixture in sufficient quantity to provide the proper paste-like consistency during the coating and laying operations. I have also found this practice valuable in cold weather where the fluid ingredients of the binder become very stiff due to low atmospheric temperatures. In this way, compositions employing high viscosity binders may be prepared and laid cold at seasons heretofore considered impractical.

The binder paste material may be prepared in an ordinary mixing mill, such as a concrete mixer, into which the ingredients of the bituminous binder, including the fluids and powdered solids, are introduced in proper proportions and commingled together. Thus prepared the paste is coated over the surfaces of the mineral aggregate particles by mechanical admixture therewith in any suitable way.

My method is well adapted for preparing compositions in place on road surfaces. The method is employed in such road-mix work by first arranging the aggregate metal on the roadway in a windrow having substantially uniform cross sectional dimensions throughout its length. The binder paste is then distributed on or alongside of the windrow in quantities sufficient to properly coat the aggregate. The aggregate and the binder are then thoroughly commingled together in situ by a suitable road mixing machine such as that disclosed in my co-pending joint application filed February 23, 1932 which bears Patent Office Serial No. 594,406.

Due to problems involved in handling and transporting large quantities of the paste, I prefer to prepare it in transit and distribute it as fast as it is prepared. To accomplish this I have provided an apparatus for preparing and distributing the binder paste. This machine may also be employed to distribute the binder ingredients separately in measured proportion, the fine solids being first distributed and the liquid ingredients being immediately distributed thereover to lay the bituminous dust and thus prevent it from being suspended, cloudlike, in the air, or blown away from the place of operation by the wind.

Referring to the accompanying drawing which forms a part of this specification:

Figure 1 is a plan view of a binder distributing apparatus followed by a vehicular mixing machine for coating road aggregate metal with the distributed binder.

Figure 2 is a side elevation of the binder distributing apparatus, shown partly in section to clearly reveal the material handling mechanism.

Figure 3 is a rear end view of the apparatus shown in Figure 2.

10 indicates a conventional road vehicle or truck having wheels, axles, a frame, a platform supported by the frame, and all other parts and appurtenances necessary to vehicles of this type. Mounted on the truck near the rear end thereof is a hopper 11 for powdered bitumen 12 shown stored therein. The discharge port at the bottom of the hopper is provided with a sliding gate 13 which extends externally thru a wall of the hopper and is provided with a handle whereby it may be manually adjusted to regulate the gravitational discharge of the powder 12 from the hopper.

Immediately under the discharge gate of the hopper is a mixer 14 into which the powder 12 may be discharged. The mixer comprises a metal casing 15 thru which a rotatable shaft 16 extends and carries a plurality of radial and rearwardly piched mixer blades 17—17 etc. These blades, when rotated, are adapted to commingle particles of the finely divided bituminous material 12 and to feed the material rearwardly into an extruder 18 located under the mixer and extending rearwardly thereof. The extruder 18 is of volumetric capacity substantially less than that of the mixer and comprises a casing 19, thru which a rotatable shaft 20 extends to drive a helicoidal conveyor screw 21. The casing 19 is here shown integral with the mixer casing 15 and closely shrouds the screw 21 which is designed to convey material away from the mixer and discharge it at a fixed rate from its open rear end, all as will be readily understood.

The mixer shaft 16 is driven thru a sprocket chain 22 by a shaft 23 which, in turn, is driven by motor 24 thru a conventional speed changing transmission 25, as shown. The extruder shaft 20 is driven thru a sprocket chain 26 by the mixer shaft 16.

From the description thus far it will be seen that when the motor 24 is running, the extruder 18 will discharge material at a constant rate, depending upon the speed of its screw 21, so long as there is material above its capacity in the mixer 14. Therefore, the quantity of material in the mixer may vary from nearly empty to overflowing without affecting the constancy of the extruder output. It will also be noted that the driving arrangement is such that the speed of the shafts 16 and 20 are always alike or proportionate to each other, regardless of the gear speed selected in the transmission 25 or the speed of the motor 24.

Forward of the motor 24, a storage tank 30 for liquid binder material is mounted on the truck 10 and is provided with an outlet conduit 31 which communicates with the inlet port of a pump 32, here shown positioned intermediate the motor transmission 25 and the hopper 11. The pump is also driven by drive shaft 23 by means of a sprocket chain 33 and is adapted to pump fluid binder material from the tank 30 and into a discharge conduit 34 which leads to and communicates with a distributor head 35, positioned just rearward of and above the discharge end of the extruder 18. It will thus be seen that the pump is driven at a speed the same or in direct proportion to the speed of the mixer and extruder at all times and, therefore, that the quantity of liquid solvent discharged from the distributor head 35 will always be in direct proportion to the quantity of material discharged by the extruder.

As described, the apparatus is well adapted to separately distribute the powdered and liquid ingredients of the binder paste in measured proportionate quantities to be mixed by the rotary road mixer 40 simultaneously as they are coated onto the aggregate material 45 lying in a windrow-like pile on the roadway. Because of the arrangement of the liquid distributing head 35 relative to the discharge end of the extruder, the dust-like powdered bitumen is immediately wetted down by the discharging fluid.

The apparatus may also be employed, if preferred, to combine the binder paste ingredients before distributing them onto the roadway by a very slight modification in structure which consists in dispensing with the distributor head 35 and leading the conduit 34 directly into the mixer 14 as indicated by dotted lines at 36 in Figure 2. When the binder paste is thus premixed, it is important that the flow of dry material 12 from the hopper 11 into the mixer 14 be maintained constant in proper proportion to the flow of fluid into the mixer.

In operation the apparatus is employed as follows:

The truck 10 is propelled on the roadway at a constant predetermined speed in such directional position that the binder material is discharged onto or adjacent the windrowed mineral aggregate 45. The truck is followed by the road mixing machine 40 which operates to thoroughly mix the binder ingredients and coat them over the surfaces of the mineral aggregate particles, or to coat the binder paste thereover, depending upon the form in which the binder is distributed. The aggregate thus coated is indicated by 50 in Figure 1 as being discharged by the road mixer 40. The composition is then laid in place on the roadway and compacted in any of the usual ways well known to those familiar with road paving work of this general character. Shortly after being coated on the aggregate, the fluid and solid binder ingredients completely amalgamate and, after the composition is compacted in place, the blended binder will coalesce the aggregate to provide a very stable pavement.

Having thus described my invention, I claim:

1. In methods of preparing road paving compositions, mechanically admixing solid ingredients of a bituminous binder in finely divided particles with fluid ingredients thereof to make a mixture of paste-like consistency, and then coating the mixture thus prepared over the surfaces of road aggregate metal at normal temperature, before the binder ingredients can completely amalgamate to form a cement.

2. In methods of preparing road paving compositions, preparing a bituminous binder of paste-like consistency comprising a mixture of finely divided solid ingredients of the binder with fluid ingredients thereof and simultaneously coating said mixture over the surfaces of road aggregate metal by mechanically admixing the said binder ingredients and said aggregate metal together at normal temperature before the binder ingredients completely blend to form a cement.

3. In methods of preparing road-mixed paving compositions, arranging mineral aggregate on a roadway, distributing solid ingredients of a bituminous binder in finely divided particles onto the arranged aggregate, immediately distributing fluid ingredients of said binder onto the solid ingredients, whereby the solid binder particles are wetted down, and then mechanically admixing the aggregate and said binder ingredients together on the roadway at normal temperature before the binder ingredients can completely blend.

4. In methods of preparing road-mixed paving compositions, arranging metal aggregate on a roadway, mechanically admixing in transit a roadway, mechanically admixing in transit solid ingredients of a bituminous binder with fluid ingredients thereof to make a paste-like mixture, distributing the mixture continuously as it is thus prepared onto or adjacent the arranged aggregate, and then promptly admixing the binder mixture with the aggregate on the roadway to coat the mixture over the surfaces of the aggregate particles before the mixed binder ingredients can completely blend.

5. In methods of preparing road-mixed paving compositions at atmospheric temperatures, arranging metal aggregate in a windrow on a roadway, mechanically admixing a transit solid ingredients of a bituminous binder in finely divided particles with fluid ingredients thereof whereby the solid ingredients are surface-agglutinated and moistened by the fluid ingredients to make a mixture of a paste-like consistency, distributing the mixture continuously as it is thus prepared onto or adjacent the windrowed aggregate, mechanically admixing said mixture with the aggregate on the roadway to coat the mixture over the surfaces of the aggregate, before the mixed binder ingredients can completely blend to form a cement, and then compacting the coated aggregate in place on the roadway.

6. In methods of preparing road-mixed paving compositions at atmospheric temperatures, arranging metal aggregate in a windrow on a roadway, distributing solid ingredients of a bituminous binder in finely divided particles onto the windrowed aggregate, immediately distributing fluid ingredients of said binder onto the solid ingredients, whereby the solid binder particles are wetted down, mechanically admixing said binder ingredients and said aggregate together at normal temperature on the roadway, before the binder ingredients can completely blend together.

EDWIN B. CADWELL.